United States Patent [19]

Beck

[11] Patent Number: 4,927,679

[45] Date of Patent: May 22, 1990

[54] PREFORM FOR A MONOBASE CONTAINER

[75] Inventor: Martin H. Beck, Merrimack, N.H.

[73] Assignee: Devtech, Inc., Amherst, N.H.

[21] Appl. No.: 261,551

[22] Filed: Oct. 21, 1988

Related U.S. Application Data

[63] Continuation-in-part of Ser. No. 129,642, Dec. 7, 1987, Pat. No. 4,889,752, which is a continuation-in-part of Ser. No. 55,647, May 29, 1987, Pat. No. 4,780,257.

[51] Int. Cl.[5] .................................................. B65D 23/00
[52] U.S. Cl. ................................ 428/36.92; 215/1 C; 220/70; 264/532; 425/529; 428/542.8
[58] Field of Search ..................... 428/542.8, 36.92; 215/1 C; 264/532; 425/529; 220/70

[56] References Cited

U.S. PATENT DOCUMENTS

| | | | |
|---|---|---|---|
| 3,031,095 | 4/1962 | Loughran | 215/1 C |
| 3,043,461 | 7/1962 | Glassco | 215/1 C |
| 3,137,748 | 6/1964 | Makowski | 264/97 |
| 3,511,401 | 5/1970 | Lachner | 215/1 C |
| 3,598,270 | 8/1971 | Adomaitis et al. | 215/1 C |
| 3,643,829 | 2/1972 | Lachner | 215/1 C |
| 3,655,084 | 4/1972 | Wilhaus et al. | 215/1 C |
| 3,718,229 | 2/1973 | Wyeth et al. | 215/1 C |
| 3,720,339 | 3/1973 | Khetani | 215/1 C |
| 3,722,726 | 3/1973 | Carmichael et al. | 215/1 C |
| 3,757,978 | 9/1973 | Gilbert | 215/1 C |
| 3,759,410 | 9/1973 | Uhlig | 215/1 C |
| 3,811,588 | 5/1974 | Vermeerbergen et al. | 215/1 C |
| 3,870,181 | 3/1975 | Sincock | 215/1 C |
| 3,871,541 | 3/1975 | Adomaitis | 215/1 C |
| 3,881,621 | 5/1975 | Adomaitis | 215/1 C |
| 3,900,120 | 8/1975 | Sincock | 215/1 C |
| 3,917,095 | 11/1975 | Seefluth | 215/1 C |
| 3,934,743 | 1/1976 | McChesney | 215/1 C |
| 3,948,404 | 4/1976 | Collins et al. | 215/1 C |
| 4,024,975 | 5/1977 | Uhlig | 215/1 C |
| 4,108,324 | 8/1978 | Krishnakumar et al. | 215/1 C |
| 4,134,510 | 1/1979 | Chang | 215/1 C |
| 4,177,239 | 12/1979 | Gittner et al. | 264/530 |
| 4,219,124 | 8/1980 | Amberg | 215/12 R |
| 4,241,839 | 12/1980 | Alberghini | 215/1 C |
| 4,247,012 | 1/1981 | Alberghini | 215/1 C |
| 4,249,667 | 2/1981 | Pocock et al. | 215/1 C |
| 4,254,882 | 3/1981 | Yoshino | 215/1 C |
| 4,256,221 | 3/1981 | Cioe et al. | 215/1 C |
| 4,261,948 | 4/1981 | Krishnakumer et al. | 264/532 |
| 4,267,144 | 5/1981 | Collette et al. | 215/1 C |
| 4,287,150 | 9/1981 | Gendron | 264/538 |
| 4,330,579 | 5/1982 | Ota et al. | 215/1 C |
| 4,334,627 | 6/1982 | Krishnakumar et al. | 215/1 C |
| 4,335,821 | 6/1982 | Collette et al. | 215/1 C |
| 4,359,165 | 11/1982 | Jakobsen | 215/1 C |
| 4,403,706 | 9/1983 | Mahajan | 215/1 C |
| 4,406,854 | 9/1983 | Yoshino | 215/1 C |
| 4,436,216 | 3/1984 | Chang | 215/1 C |
| 4,442,944 | 4/1984 | Yoshino et al. | 215/1 C |
| 4,463,056 | 7/1984 | Steele | 428/542.8 |
| 4,467,929 | 8/1984 | Jakobsen et al. | 215/1 C |
| 4,483,891 | 11/1984 | Cerny | 428/542.8 |
| 4,502,607 | 3/1985 | Szajna | 215/1 C |
| 4,525,401 | 6/1985 | Pocock et al. | 215/1 C |
| 4,576,843 | 3/1986 | Beck | 215/1 C |
| 4,598,831 | 7/1986 | Nakamura et al. | 215/1 C |
| 4,615,667 | 10/1986 | Roy | 264/532 |
| 4,615,925 | 10/1986 | Nilsson | 428/542.8 |
| 4,615,928 | 10/1986 | Kawaguchi et al. | 215/1 C |
| 4,725,464 | 2/1988 | Collette | 215/1 C |
| 4,755,404 | 7/1988 | Collette | 215/1 C |

FOREIGN PATENT DOCUMENTS 0247566 12/1987 European Pat. Off.
1436468 3/1966 France.

Primary Examiner—James J. Seidleck
Attorney, Agent, or Firm—Davis, Bujold & Streck

[57] ABSTRACT

An improved preform for blow molding a one-piece plastic container of the champagne base variety having an annular peripheral chime surrounding an inward sloping base portion for containing carbonated beverages. The preform defining interior and exterior walls which are ever decreasing in diameter from the neck to the base so that the preform may be easily removed from a mating core and injection mold cavity used therewith thereby avoiding the need for a split mold to form the preform. The preform including a thickened annulus adjacent the transition between side wall and base forming portions thereof and an exterior weight reducing annular concavity between the thickened annulus and the closed end of the preform.

21 Claims, 7 Drawing Sheets

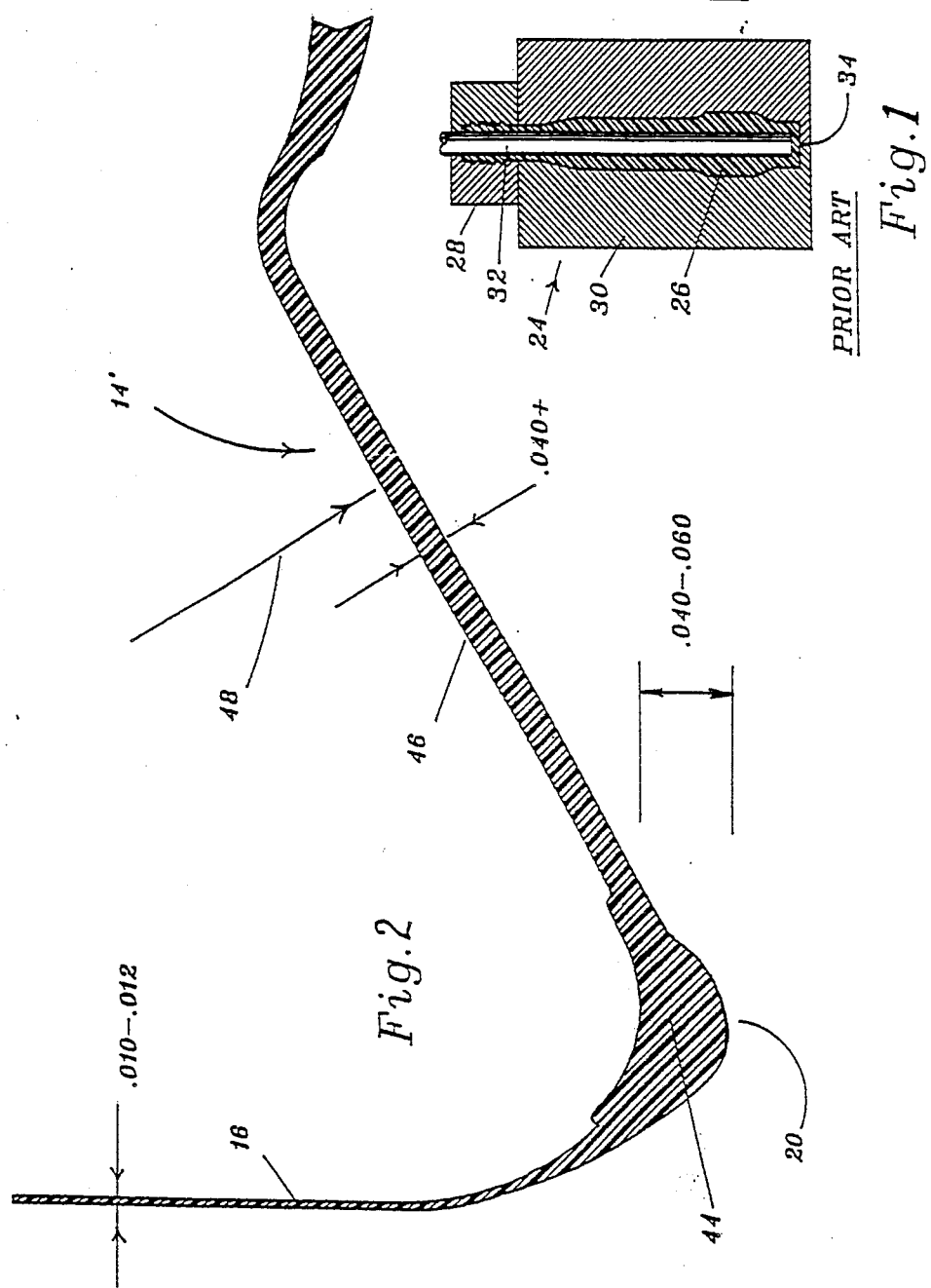

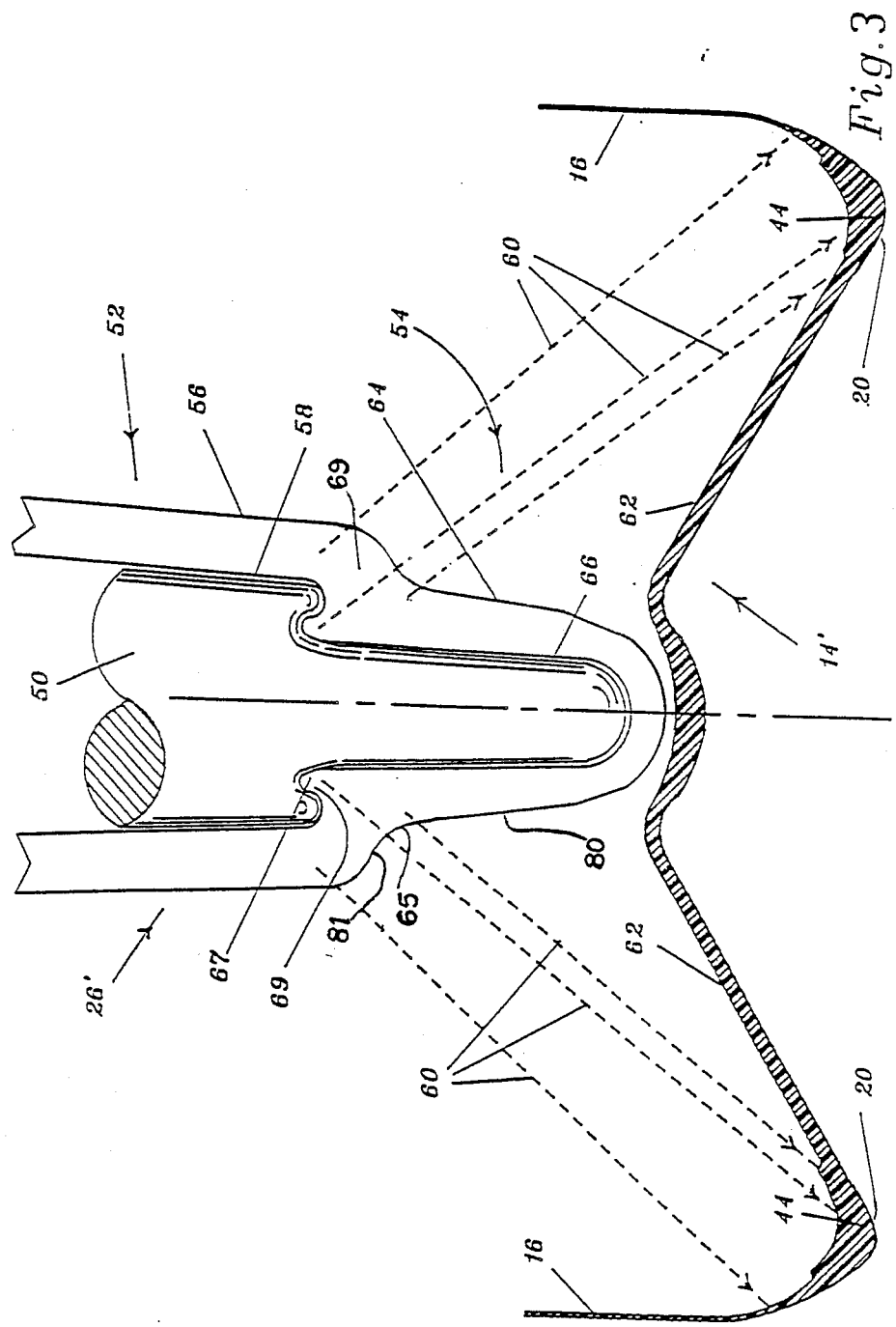

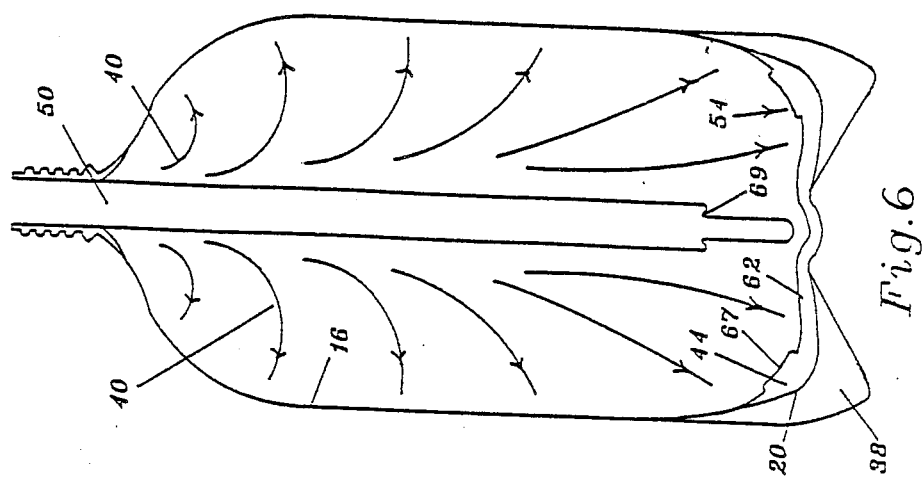
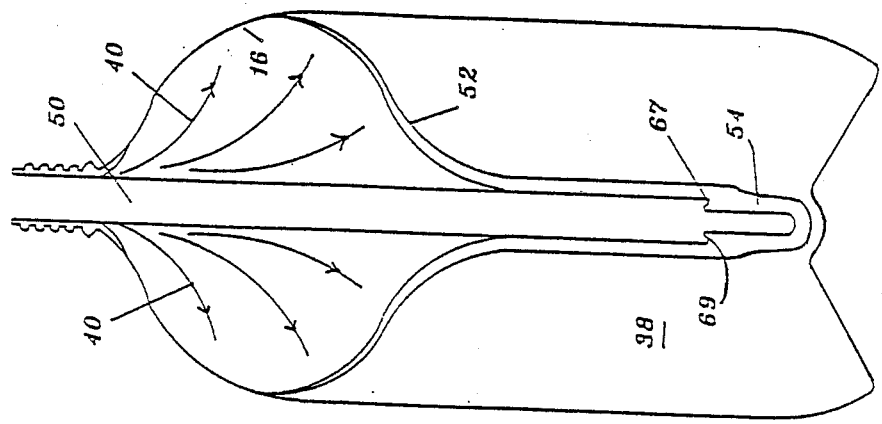
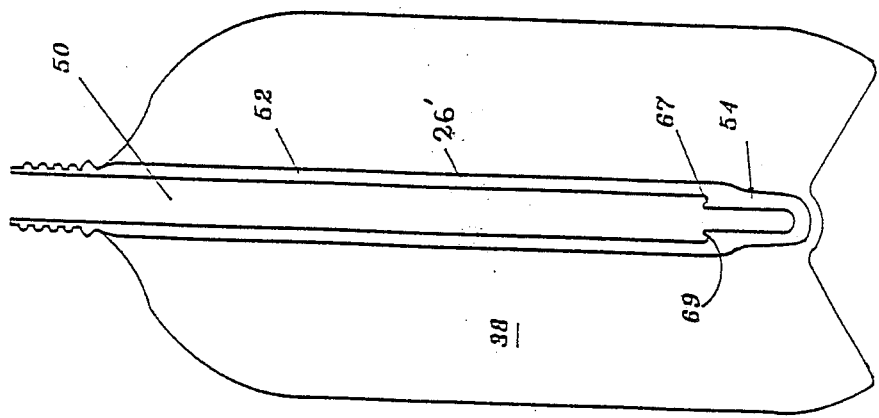

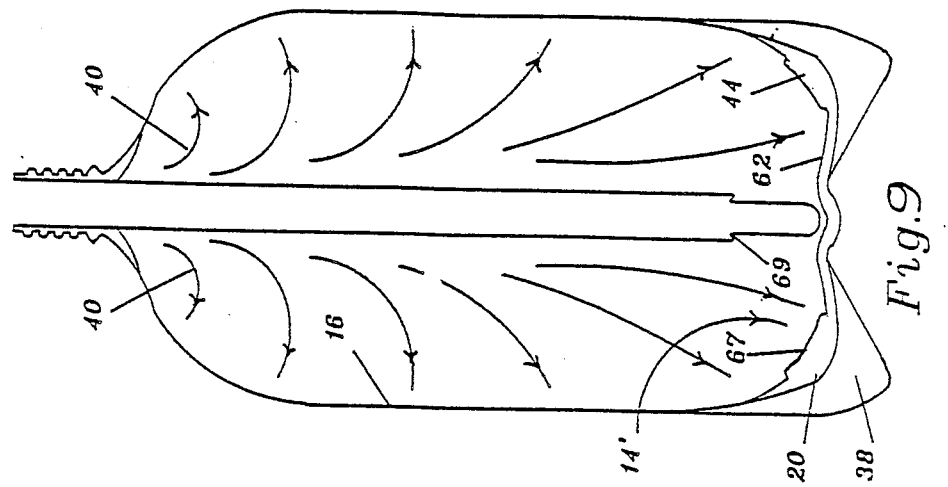
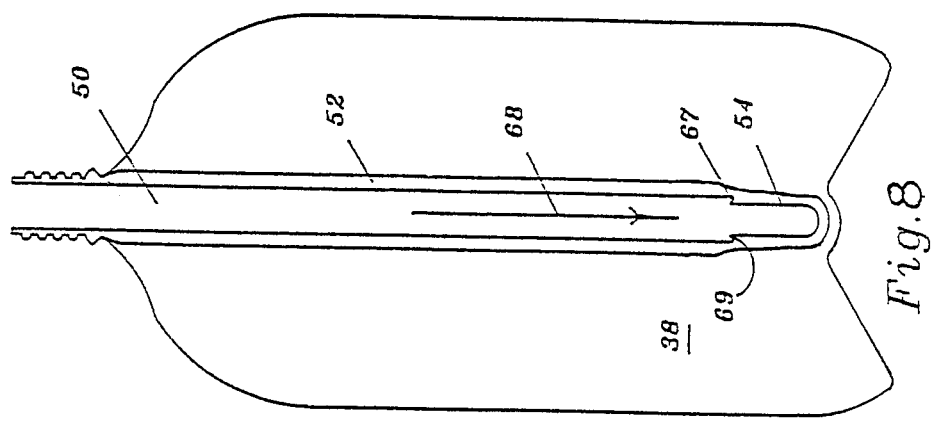
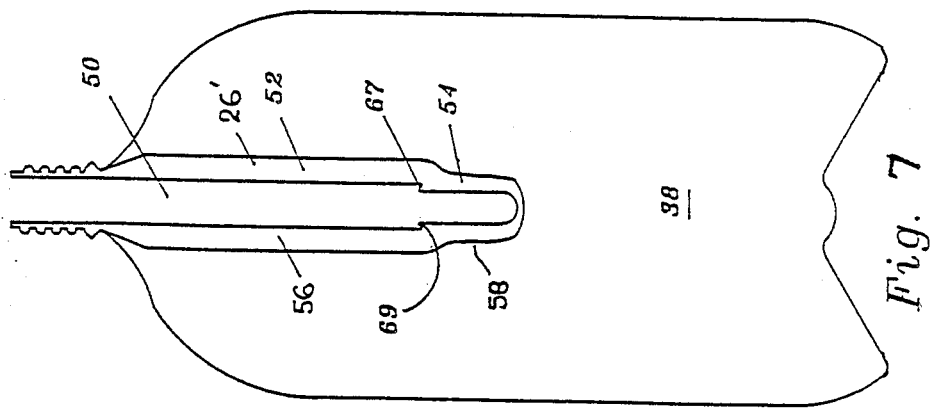

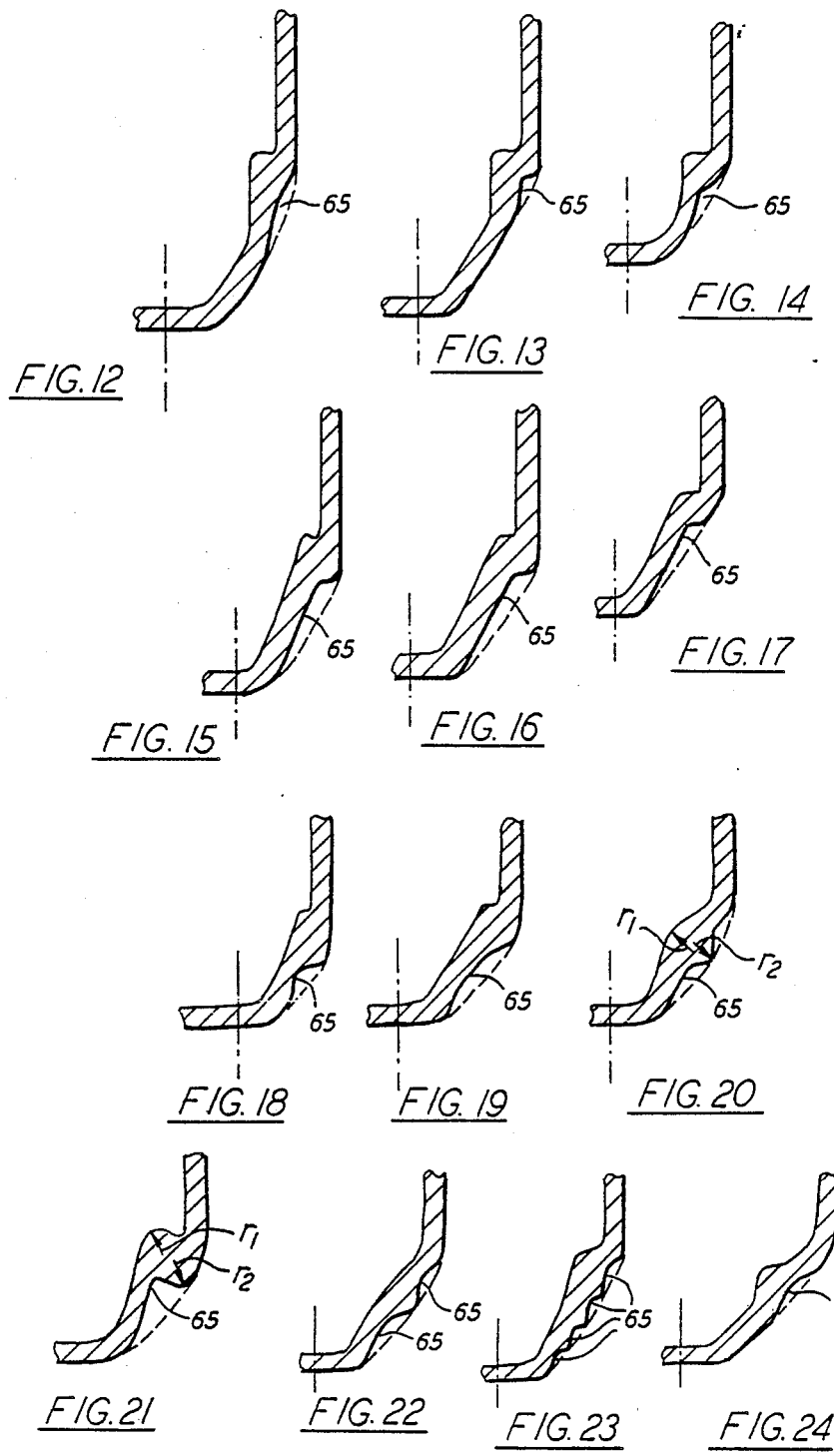

PREFORM FOR A MONOBASE CONTAINER

This is a Continuation-In-Part of patent application Ser. No. 129,642 filed Dec. 7, 1987, U.S. Pat. No. 4,889,752 which is a Continuation-In-Part of patent application Ser. No. 055,647 filed May 29, 1987, U.S. Pat. No. 4,780,257.

BACKGROUND OF THE INVENTION:

The present invention relates to a preform for forming a one-piece disposable (i.e. single service) plastic container (e.g. a bottle) of the champagne base variety having an annular peripheral chime surrounding an inward sloping base portion for containing carbonated beverages, the container resisting inversion of the base caused by internal pressure comprising the use of an integral reinforcing ring incorporated into the base and running horizontally in the hoop direction, the reinforcing ring being placed in a location within the base that has a moment arm trying to invert the base and providing sufficient strength to withstand that moment arm and keep the push up of the inward sloping portion intact by expanding an elongate preform containing the plastic material for the neck, body and base of the bottle into a mold. The preform is formed with annular thickened portions of the preform shaped and positioned along the length thereof such that during blowing of the preform the material of the preform will be deposited so that the inward sloping base portion and the chime have a distribution of material which will resist deformation which will otherwise occur as a result of the moment arm created around the chime by internal pressure to prevent unrolling and radial stretching of the chime sufficient to allow inversion of the inward sloping base portion.

One aspect of plastic bottle production by blow molding techniques which is known in the art is the use of varying wall thicknesses at critical points of stress, such as in the neck and capping threads A good example of such a prior art approach and the apparatus employed therewith can be seen with reference to U.S. Letters Pat. No. 3,137,748 to Makowski. FIG. 1 hereof depicts the apparatus of Makowski in simplified form. As shown in FIG. 1, a double two-part mold 24 is used to create a preform 26 of the plastic to be used for the bottle. The mold 24 has a neck-producing portion 28 and a bottle-producing portion 30. A hollow core pin 32 is inserted into the assembled mold 24 and the preform 26 made by injecting the plastic through a sprew hole at 34. The bottle-producing portion 30 of the mold 24 must be a two-part or split mold since the core pin 32 is cylindrical and the preform 26 contains areas of various thickness to provide additional material for various areas of the finished bottle.

The preform 26 with the core pin 32 therein and the neck-producing portion 28 of the mold 24 in place is removed from the bottle-producing portion 30 following the injection molding procedure and mounted to a blow mold having a bottle-defining cavity therein. As known by those skilled in the art, various considerations relative to the temperature of the preform prior to the actual blow molding step must be accounted for. The core pin 32 of Makowski is hollow and contains an integral valve (not shown) at the bottom end thereof. With the preform 26 positioned within a cavity, the valve is opened and pressurized air is injected causing the preform 26 to stretch outward from the bottom up to fill the cavity and thereby create the final bottle.

The Makowski patent is not directed to producing a pressure-resistant bottle. The variations in thickness of the preform 26 are to provide different amounts of material available for stretching to form various parts of the bottles shown therein which are of complex shape, such as those used for dishwashing liquids and the like. There is no need for the accurate placement of integral reinforcement-producing areas. Moreover, the preform design with respect to the cylindrical core pin 32 makes the use of a more costly and complex two-part or split injection mold for the production of the preform a necessity.

Wherefore, 1L is an object of the present invention to provide a cost effective preform for forming a one piece plastic bottle for containing carbonated beverages which is of the champagne type but which resists inversion from internal forces using a minimum of material without the necessity of including complex rib structures therein.

It is a further object of the present invention to provide a preform which can be produced in a simple one-part injection mold.

It is yet another object of the present invention to provide a preform in which the reinforcing sections can accommodate encountered inaccuracies in positioning during the blow molding process.

It is yet another object of the present invention to provide a preform shape with increased heat dissipating surface area in areas of increased thickness.

Further objects and advantages of the present invention will become apparent from the description contained hereinafter in combination with the accompanying illustrative drawing figures.

SUMMARY OF THE INVENTION

The foregoing objects have been accomplished in the present invention by an improved preform for use in a blow molding process for producing a one-piece plastic container by expanding a hollow preform containing material for a neck, sidewall and base of the container in a mold; the preform having an open neck to form the neck, a sidewall-forming portion of constant thickness and a base-forming portion including thickened portions positioned such that following blowing of the preform the material of the base-forming portion is deposited so that an inward sloping base portion is of a thickness sufficient to resist self-deformation and create a moment arm thereof around a chime tending to unroll and radially stretch the chime, the chime having an integral reinforcing hoop formed therein for preventing unrolling and radial stretching of the chime sufficient to allow inversion of the inward sloping base portion, the preform defining interior and exterior walls which are ever decreasing in diameter from the neck to the base so that the preform may be easily removed from a mating core and injection mold cavity used to mold the preform thereby avoiding the need for a split mold to form the preform, and the base forming portion having an exterior annular concavity adjacent the thickened portion remote from the sidewall-forming portion.

In the preferred embodiment, the preform is foreshortened from the neck to the base with respect to the corresponding distance in the finished bottle. In the preferred embodiment, the stretch rod contacts an interior annular shoulder on the preform adjacent the base-forming portion thereof so that virtually all the stretching of the preform takes place in the sidewall-producing portion thereof.

BRIEF DESCRIPTION OF THE DRAWINGS:

The present invention will now be described by way of example, with reference to the accompanying drawings, in which:

FIG. 1 is a simplified partially cutaway drawing showing a prior art apparatus for making a preform used in blow molding a one piece plastic bottle;

FIG. 2 is an enlarged cutaway drawing of one-half the base portion of a one piece plastic bottle made from a preform according to the present invention.

FIG. 3 is an enlarged partially cutaway drawing showing the base portion of the one piece plastic bottle of FIG. 2 along with the preform structure according to the present invention which produces it and indicating the manner in which the portions of the preform move to form the self-rigidizing, inversion resistant, champagne base of the present invention.

FIGS. 4-6 are simplified diagrammatic drawings showing the method and apparatus for forming a one-piece plastic bottle according to a preform of the first embodiment of the present invention;

FIGS. 7-9 are simplified diagrammatic drawings showing the method and apparatus for forming a one-piece plastic bottle according to a preform of the second embodiment of the present invention;

FIGS. 12-24 show a number of different embodiments of preform base shapes according to the present invention.

Figure 10:
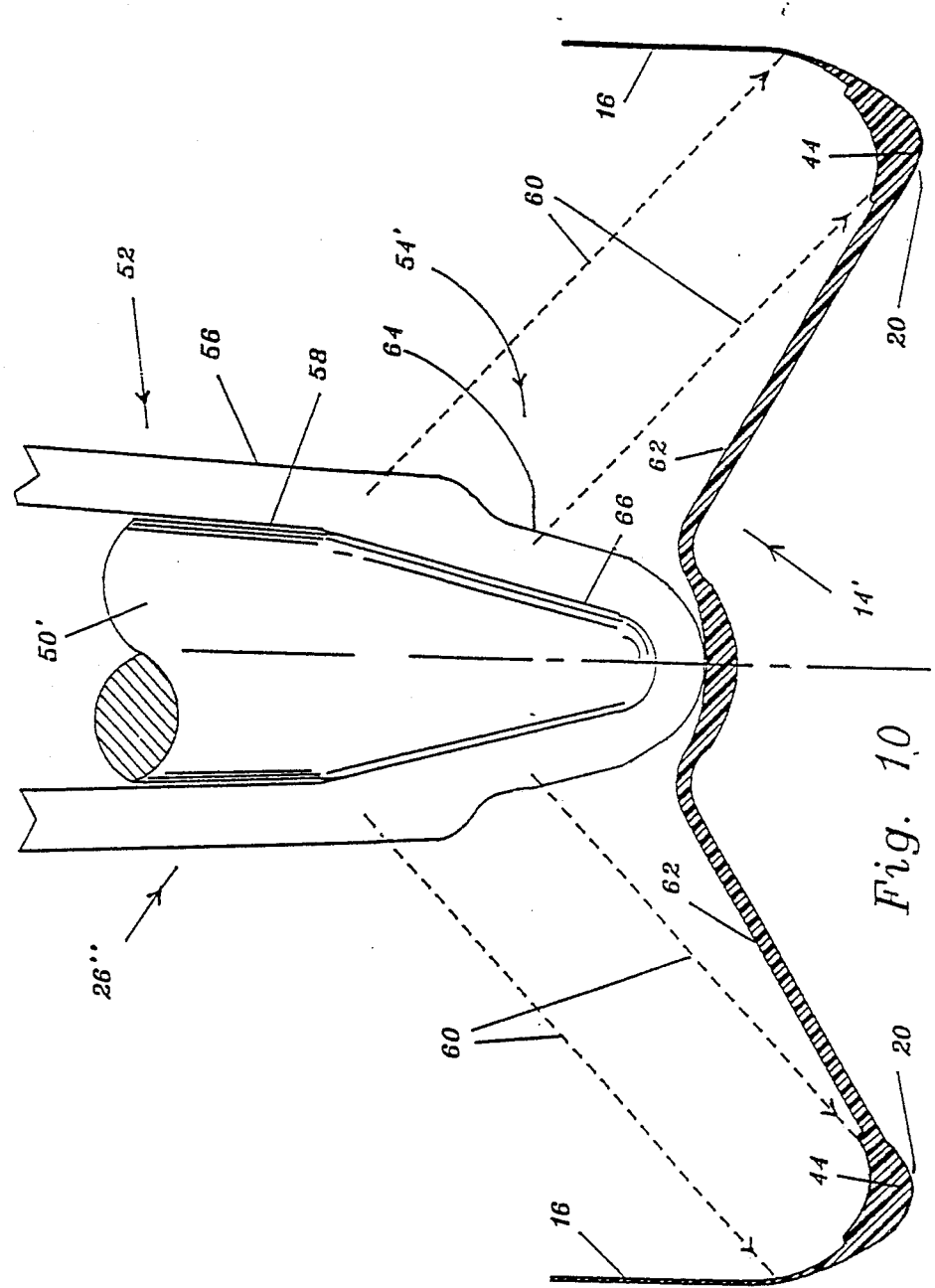
FIG. 10 is an enlarged partially cutaway drawing showing the base portion of a one piece plastic bottle along with the preform structure according to the present invention in an alternate embodiment which produces it and indicating the manner in which the portions of the preform move to form the self-rigidizing, inversion resistant, champagne base of the present invention.

DESCRIPTION OF THE PREFERRED EMBODIMENT:

The present invention is directed to a novel shaped preform for forming a free-standing, one piece plastic bottle, preferrably of PET (polyethylene terephthalate), for carbonated beverages having a champagne bottle type shaped base of controlled thickness to provide an annular chime to provide stable upright standing ability. One feature is that the shape of the preform's interior and exterior walls are ever decreasing in diameter from the neck to the base so that it may be easily removed from a suitable core and injection mold cavity thereby avoiding the need for a split mold as in the Makowski teaching.

Base construction for the base of a bottle formed by the preform according to the present invention is shown in detailed cross-section in FIG. 2. As can be seen therein, the sidewalls 16 are of somewhat typical construction and thickness. Moreover, the shape of the base is also somewhat typical, meaning that the basic blow molds therefor can be retained. The outside radius of the chime 20 is also substantially the same as usual. As can be appreciated from the cross-sectional view of FIG. 2, however, the thickness of the chime 20 is such as to create an internal/integral reinforcing hoop 44 connected to a thickened base portion 46 extending between the reinforcing hoop 44 and the center of the base 14'. Pressure, as indicated by the arrow 48, pushes on the thickened base portion 46 which, because of its increased thickness, resists self-deformation and acts as a moment arm on the chime 20 trying to unroll it and stretch it radially outward in order to allow the base 14' to invert. Because of the integral reinforcing hoop 44, however, the chime 20 resist both the tendency to unroll and stretch radially outward. As a result, inversion is prevented.

To achieve sufficiently accurate and repeatable placement of reinforcement quantities of plastic from the preform during blow molding and use of a simplified preform molding process as part thereof, the present invention deviates from the teachings of Makowski in several major ways. First, the preform and core rod employed in the present invention are such that the shape of the preform's interior and exterior walls are ever decreasing in diameter from the neck to the base so that it may be easily removed from the core and the injection mold cavity, thereby avoiding the need for a split mold. Second, when blowing the preform, it is preferably done from the top down rather than the bottom up. Finally, in the preferred embodiment, the preform is axially stretched in the sidewall-producing area prior to blowing so as to assure less distortion and more accurate placement of the base-producing portion thereof.

FIG. 3 shows in detail one embodiment of a stretch rod 50 inserted into the preform 26' as employed in the present invention. While the form of the single piece injection mold and associated core rod which can be employed to produce the preform 26' is not shown, those skilled in the art will readily recognize the requirements thereof from the shape of the preform 26' itself. The preform 26' is composed of two parts—a sidewall-producing portion, generally indicated as 52, and a base-producing portion, generally indicated as 54. The sidewall-producing portion 52 is of substantially constant thickness so as to produce the constant thickness sidewalls 16 of the finished bottle. The achieve this with the ability to be removed from a single piece mold, the exterior surface 56 of the preform 26' in the sidewall-producing portion 52 tapers inward slightly from the top to the bottom as does the exterior surface 58 of the core rod used to produce it in the same area. As indicated by the dashed lines 60, the base-producing portion 54 of the preform 26' includes thickened area 63 which ultimately forms the reinforcing hoop 44. Again, to achieve this with the ability to be removed from a single piece mold, in one possible embodiment, the exterior surface 64 of the preform 26' in the base-producing portion 54 tapers inward more radically from the top to the bottom while the exterior surface 66 of the core rod used to produce it (not shown) in the same area tapers only slightly while being of significantly smaller diameter. The exterior surface 64 of the base-producing portion 54 includes an annular concavity or recess 65 which serves to minimize material usage in producing a container of the desired strength while at the same time, with appropriately shaped concavities, increasing heat dissipation by comparison with the shapes proposed in U.S. patent applications Ser. Nos. 129,642 and 055,647. Finally, at the point where the sidewall-producing portion 52 meets the base-producing portion 54, the preform 26' contains an annular shoulder or surface 67 which is engaged by a matching annular surface or recess 69 in the end of the stretch rod 50. The purpose thereof will be described in detail shortly. For the present, those skilled in the art will appreciate that the shape and placement of the annular shoulder 67 is such as to allow it to be produced in a one piece mold. In order to be inserted into the preform 26' following the molding thereof, except at the point of the shoulder 67, the outside diameter of the stretch rod 50 at each point along the length thereof must be slightly less than the inside diameter of the preform 26' at the corresponding point and, therefore, there is a slight gap between the two in most places except at the point of contact with the shoulder 67.

Turning now to FIGS. 4-6, a method of blow molding the preform of the present invention will be described. As shown in FIG. 4, the preform 26' is positioned within a bottle-defining cavity 38 of a blow mold. For simplicity only the interior surface of the mold is shown. In this embodiment, the bottom of the preform 26' is initially placed close to but preferrably not in contact with the bottom of the cavity 38. Appropriate heating of the preform 26' to blow molding temperatures in a manner well known to those skilled in the blow molding art for the materials employed will have been accomplished at this point. Spacing the bottom of the preform 26' from the bottom of the cavity 38 provides room for the preform 26' to move longitudinally to disengage the shoulder 67 from the recess 69 so that the base-producing portion 54 can then move properly to its desired final position.

As shown in FIGS. 5 and 6, pressurized air 40 is then injected between the stretch rod 50 and the preform 26' at the top causing the preform 26' to separate from the core rod 50, stretch, and form the sidewalls 16 of the bottle from the top down. In the base-producing portion 54, very little radial stretching take place as that portion, which is positioned last, lays over to form the base 62' including the reinforcing hoop 44 within the chime 20 as desired.

A second, and preferred, approach is shown in FIGS. 7-9. A second embodiment of the preform 26' is also shown therein wherein the base-producing portion 54 has an exterior surface 58 which is an extension of the exterior surface 56 above it and terminates in a modified rounded tip. In FIGS. 7-9, the preform 26' is foreshortened in length. It is initially placed within the bottle-defining cavity 38 as in the previous embodiment. The stretch rod 50, however, is extendable and, as depicted in FIG. 8, it is then pushed downward as indicated by the arrow 68 until the bottom of the preform 26' is positioned close adjacent (but spaced from) the bottom of the cavity 38 as in FIG. 4 of the previous embodiment. During this step, the sidewall-producing portion 52 of the preform 26' is stretched longitudinally. Because the shoulder 67 is engaged by the recess 69 and there is a gap between the preform 26' and the stretch rod 50 elsewhere, however, the stretching forces are generally applied at the point of the shoulder 67 and the recess 69 and virtually all the stretching (i.e. 0-2 x) takes place in the sidewall-producing portion 52 and the base-producing portion 54 is minimally stretched, if at all, and remains relatively undistorted. As is well known by those skilled in the art, preferred performance is obtained in the bi-axial blow molding of PET containers with proper longitudinal and axial stretching of the material during the molding process. The above-described physical stretching process performs two functions. For one, it provides a constant and uniform longitudinal stretching of the PET plastic in the sidewall-producing portion 52 with attendant ultimate performance benefits. For another, it assures that radial stretching of the sidewall-producing portion 52 is accurate, resulting in the subsequent accurate placement of the base-producing portion 54 to form the thickened base portion 46 and the reinforcing hoop 44 within the chime 20, as desired.

A beneficial side effect of the shoulder, once blown, is its ability to indicate proper placement of the base-producing portion. Since the PET plastic is transparent and a portion of the shoulder 67 remains distinctly apparent on the inner surface of the chime 20, the radial position of the nub 67 following the blow molding process is visible from outside the final bottle. Its radial position can be used in the quality assurance process to determine if the base-producing portion is properly placed, or radially too far in or too far out. By adjusting the process parameters (such as temperature, rate of blowing and stretching, etc.) and checking the results by means of the position of the shoulder 67 in the final product, accurate placement of the hoop 44 within the chime 20 can be repeatably achieved. The radial extension of the hoop 44 allows for some misalignment of the hoop without losing the desired reinforcement of the chime area.

The principal feature of the preform made in accordance with the present invention is that the exterior surface of the base-producing portion 54 is provided with an annular recess 65 extending completely around the base of the preform. The overall dimensions of the preform (i.e. height, length, depth, etc.) will determine the amount of material and the exact location of the material deposited in the region of the chime 20. In the embodiment shown in FIG. 3, the recess 65 located around the exterior portion of the base portion 64 comprises a frusto-conical surface 80 of relatively small taper joined to a frusto-conical surface 81 of relatively large taper. One alternative embodiment of the present invention not employing the nub 67 of the previously described embodiments is depicted in FIG. 10. While not preferred because of the lesser control over the placement of the thickened chime material, this embodiment is still an improvement over the prior art. It can be accomplished with stretching as in the embodiment of FIG. 7-9, with controlled heating of only the sidewall-forming portion, or without as in the embodiment of FIG. 4-6. In this embodiment, the stretch rod 50' contacts the inner end of the preform 26'' to spread the forces equally across the entire portion for equal stretching to occur within the preform 26''. Additionally, the bottom of the preform 26'' is initially placed against the bottom of the mold (i.e. there is no spacing therefrom as in the previously described embodiments). Because there is no interlocking of the nub and groove as in the previous embodiments, longitudinal travel to affect unlocking thereof prior to radial stretching is unnecessary. Moreover, as can be seen from the figure, more material has been added to the outside of the base-forming portion 54' of the preform 26'', in combination with the contacting relationship of the preform 26'' to the mold, which is desirable as it improves the inherent placement accuracy; that is, the more stretching required and the further the materials have to travel, the less accurate the final placement thereof - the most accurate, of course, being a simple fold over with no stretching or distortion.

Figure 11:
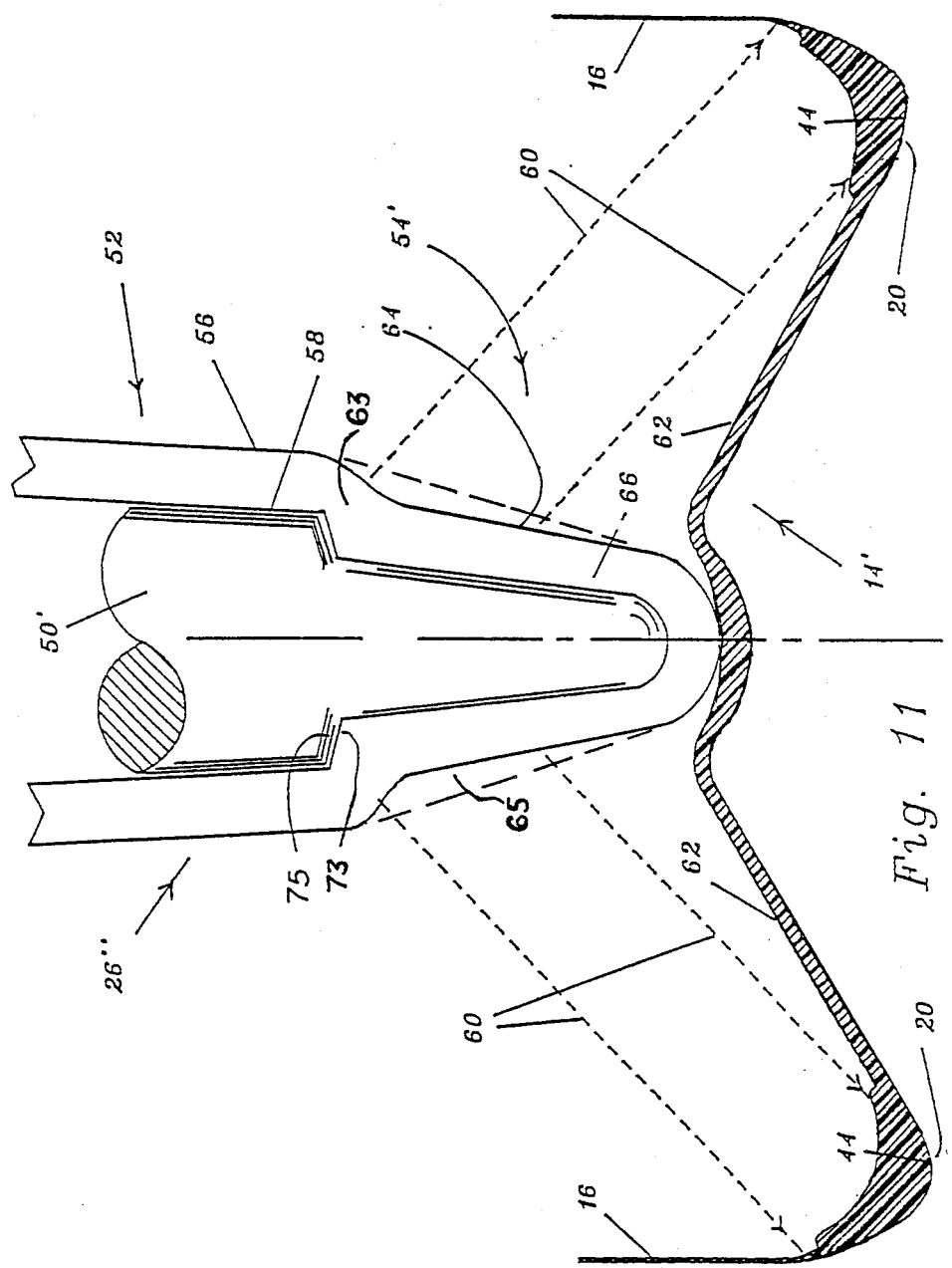
FIG. 11 is an embodiment similar to FIG. 10 in which the engagement between the stretch rod and the preform is modified.

A further embodiment of the present invention, which also does not employ the nubs 67, is shown in FIG. 11. In this embodiment, the stretch rod 50' has an annular recessed flange like portion 75 on its lower tapered end which engages with a protruding portion 73 on the lower end of preform 26". The engagement of the recess portion 75 of the stretch rod with the protruding portion 73 of the preform 26" results in a substantially equal longitudinal stretching of the sidewall-forming portion 52' of the preform until the convex portion forming the closed end of the base-forming portion 54' of the preform abuts or is closely adjacent a downwardly directed apex in the bottom center portion of the mold. Thereafter, the blowing process can proceed to result in a substantially uniform blown container.

The arrangement shown in FIG. 11 is also a non-interlocking engagement which allows the base-forming portion 54' of the preform 26" to be easily laid at any desired location during the blowing stage. It is to be noted that the parameters of the recess portion 75 and protruding portion 73 (i.e. their overall dimensions, inclined angles, etc.) will influence how much material is deposited on chime 20 and where the deposits will occur. By controlling these parameters, one can adequately control the thickness of any desired portion of the base.

FIGS. 12–24 illustrate a number of examples of base shapes for preforms according to the present invention, all of which include an annular concavity or recess 65. The exterior surface shape without the recess formed therein is shown in phantom. In the case of the examples shown in FIGS. 20, 22 and 23 a plurality of such recesses are utilized and in the examples of FIGS. 20 and 21 portions of interior and exterior surfaces define cross-sections defined by radii $r_1$, and $r_2$. In all cases the preforms include material placed to provide a desired distribution of material in the base of the container to be blow molded from the preform while eliminating excess material not essential to the structural requirements of the finished container.

The actual weight reduction will vary depending on the performance specification and the final bottle and preform design. Calculations show a 16 oz. (½ liter) preform can have weight reductions ranging from 0.4–0.9 grams. If we use 28 grams as a nominal bottle weight, our reductions range from 1.4 to 3.1%. The cost savings can be significant. As an example, if one billion bottles per year are made, each with a 0.5 gram reduction in weight (at PET resin price of $0.70/lb), the yearly cost savings is $770,000.

A larger bottle, such as a two liter bottle, would have a greater gram reduction due to the larger diameters involved. Calculations show a weight reduction range of 1–3 grams. Once again, the final performance specifications, bottle and preform designs will determine how much weight reduction is achieved.

As another example, if 1 gram of material is saved per bottle and there are 10 billion bottles made per year, the saving is 10 billion grams (or over $15,000,000 at today's PET resin price).

Further, with the removal of the excess material the preform can be cooled faster when the preform is injection molded thereby reducing the cycle time. Conversely, when the preform is reheated in a 2-step process, the amount of energy necessary to bring that area of the preform to the correct temperature is reduced.

On a one step system, the reduced cross-section of material becomes very important as it controls the injection cycle. Please remember the 1-step system blows the bottle on the downward temperature curve (i.e., no reheat), therefore the reduced cycle time is important as well as the ability to get the correct temperature profile in the preform.

By either method, when the bottle is blown, the base has to cool. With the thinner walls, better heat transfer is effected and shorter blow cycles are feasible. The one-piece bases all have the thickest cross section of material in the push up area so any reduction is an improvement. If proper base cooling is not achieved, the base will cool unevenly and differential shrinkage will take place resulting in a base that may not sit uniformly on its chime, bottle rockers, incorrect volumetrics, unwanted stressed areas of the base, etc.

I claim:

1. An improved preform for use in a blow molding process for producing a one-piece plastic container by expanding a hollow preform containing material for a neck, sidewall and base of the container in a mold; the preform having an open neck to form the neck, a sidewall-forming portion of constant thickness and a base-forming portion including an annular thickened portion positioned such that following blowing of the preform the material of the base-form portion is deposited so that an inward sloping base portion is formed which is of a thickness sufficient to resist self-deformation and create a moment arm thereof around a chime tending to unroll and radially stretch the chime, the chime having an integral reinforcing hoop formed therein to prevent unrolling and radial stretching of the chime which would allow inversion of the inward sloping base portion, the preform defining interior and exterior walls which are ever decreasing in diameter from the neck to the base so that the preform may be easily removed from a mating core and injection mold cavity used to mold the preform thereby avoiding the need for a split mold to form the preform, and the base forming portion having an exterior annular concavity adjacent the thickened portion remote from the sidewall-forming portion.

2. An improved preform according to claim 1 wherein:
at the point where said sidewall-forming portion and said base-forming portion meet, the preform has an annular protruding portion formed in the inner surface thereof, axially terminating the annular thickened portion and shaped to mate with matching recessed portion of a stretch rod when disposed within the preform.

3. An improved preform according to claim 1 wherein:
at the point where said sidewall-forming portion and said base-forming portion meet, the preform has an annular axially directed nub formed in the inner surface thereof, axially terminating the annular thickened portion and shaped to mate with a matching annular groove oppositely directed axially of a stretch rod when disposed within the preform.

4. An improved preform according to claim 2 wherein the annular protruding portion is positioned adjacent a transition from the sidewall-forming portion to the base-forming portion whereby upon stretching of the preform, following desired temperature conditioning and preparatory to blowing to form the container, by a stretch rod engaging the annular protruding portion, the sidewall-forming portion is stretched axially while the base-forming portion remains substantially undeformed.

5. An improved preform according to claim 3 wherein the annular axially directed nub is positioned adjacent a transition from the sidewall-forming portion to the base-forming portion whereby upon stretching of the preform, following desired temperature conditioning and preparatory to blowing to form the container, by a stretch rod engaging the annular axially directed nubs, the sidewall-forming portion is stretched axially while the base-forming portion remains substantially undeformed.

6. A preform according to claim 2 in combination with a stretch rod in a blow mold, said stretch rod having a matching recessed portion in mating engagement with said annular protruding portion.

7. A preform according to claim 3 in combination with a stretch rod in a blow mold, said stretch rod having a matching annular groove in mating engagement with said annular axially directed nub.

8. A preform according to claim 6 wherein the annular protruding portion is positioned adjacent a transition from the sidewall-forming portion to the base-forming portion whereby upon stretching of the preform, following desired temperature conditioning and preparatory to blowing to form the container by the stretch rod engaging the annular protruding portion, the sidewall-forming portion remains substantially undeformed.

9. A preform according to claim 7 wherein the annular axially directed nub is positioned adjacent a transition from the sidewall-forming portion to the base-forming portion whereby upon stretching of the preform, following desired temperature conditioning and preparatory to blowing to form the container, by the stretch rod engaging the annular axially directed nubs, the sidewall-forming portion is stretched axially while the base-forming portion remains substantially undeformed.

10. A one-piece self-standing plastic container when made by a blow molding using a combination according to claim 6.

11. A one-piece self-standing plastic container when made by blow molding from a preform according to claim 1.

12. A preform, for blow molding a one-piece self-standing plastic container having a neck, sidewall and base, comprising an open neck portion to form the neck, a sidewall portion to form the sidewall and a closed end base portion to form the base, the preform defining interior and exterior surfaces which are ever decreasing in diameter from the open neck to the closed base, wherein an annular thickened portion is provided to form a reinforced annular chime region in the container once formed, the entire thickness of the thickened portion being thicker than the sidewall portion and thicker than the preform between the thickened portion and the closed end of the base portion, the closed end base portion including an exterior annular concavity between said thickened portion and the closed end.

13. An improved preform according to claim 12 wherein:
at the point where said sidewall-forming portion and said base-forming portion meet, the preform has an annular surface formed in the inner surface thereof and shaped to mate with a matching recessed portion of a stretch rod when disposed within the preform to facilitate axial stretching of the sidewall-forming portion while the base-forming portion remains substantially undeformed.

14. A preform according to claim 13 wherein the thickened portion is defined, at least in part, by the annular surface and the exterior shape of the base portion.

15. A preform according to claim 14 wherein said exterior shape includes a conically tapered portion decreasing in diameter to merge with an externally convex portion forming the closed end.

16. A preform according to claim 15 wherein the annular surface faces the neck portion substantially normal to the sidewall.

17. A preform according to claim 15 wherein the annular surface comprises a conically tapered surface terminating in an internally concave surface defining the interior of the closed end.

18. A preform according to claim 16 wherein the annular surface joins the interior surface of the sidewall portion to a conically tapered interior surface of the base portion which terminates in an internally concave surface defining the interior of the closed end, the tapered interior surface having less taper than the conically tapered portion.

19. A preform according to claim 12 wherein the exterior surface between the thickened portion and the closed end includes an annular region in which the decreasing diameter is substantially greater than that of the exterior surface of the sidewall portion.

20. A preform according to claim 13 in combination with a stretch rod in a blow mold, said stretch rod having a matching recessed portion in mating engagement with said annular surface.

21. A one-piece self-standing plastic container when made by blow molding from a preform according to claim 12.

* * * * *

UNITED STATES PATENT AND TRADEMARK OFFICE
CERTIFICATE OF CORRECTION

PATENT NO. : 4,927,679

DATED : May 22, 1990

INVENTOR(S) : Martin H. BECK

It is certified that error appears in the above-identified patent and that said Letters Patent is hereby corrected as shown below:

Column 8, line 24 - change "form" to --forming--.

Signed and Sealed this

Thirtieth Day of July, 1991

Attest:

HARRY F. MANBECK, JR.

*Attesting Officer*

*Commissioner of Patents and Trademarks*